Dec. 5, 1933.                P. M. BATES                1,937,504
                       ROTATABLE SIGNALING DEVICE
                          Filed Nov. 1, 1932

Sec. H-H

P. M. Bates  INVENTOR
BY  Robert a Lavender
                ATTORNEY

Patented Dec. 5, 1933

1,937,504

UNITED STATES PATENT OFFICE 1,937,504

ROTATABLE SIGNALING DEVICE

Paul M. Bates, United States Navy

Application November 1, 1932. Serial No. 640,649

6 Claims. (Cl. 88—1)

(Granted under the act of March 3, 1883, as amended April 30, 1928; 370 O. G. 757)

This invention relates broadly to a rotating beacon, and more particuarly to a wind driven illuminable beacon.

The object of this invention is to provide a beacon or similar device adapted to reflect sunlight or to be illuminated by a light thrown against it from an exterior source, and further adapted to attract attention by the beams of light reflected from its surfaces to the eye of an observer from any possible angle, whether he be in the air or on the ground, whether near by or at a distance.

The above object is attained by a device comprising in combination a support, a plurality of dome-shaped members carried by a frame structure mounted for rotation on the support, a plurality of angularly disposed reflecting surfaces disposed at the extremities of the arms of a spider mounted for rotation on the support subjacent to the frame structure, a planetary gearing arranged on the support, and means for collecting power to drive the gearing. The surfaces of the dome-shaped members are contiguous light reflecting facets having common perimeter segments, preferably of small area and having geometric form, said facets being arranged in circles on the dome-shaped members whose planes are perpendicular to the axis of rotation of the frame structure, so that the rotation of the frame structure, will cause beams of light reflected from certain facets of its surfaces to catch the eye of an observer.

The device may be further used for advertising purposes, also to attract attention to a particular place or building, such as for example, a private land mark; it may also be used to mark a golf course or flying field or country club located among open rolling hills, and as a marine beacon for use on buoys, piers or vessels.

With the above and other objects in view, the invention consists in the construction, combination and arrangement of parts as will be described more fully hereinafter.

Reference is to be had to the accompanying drawing forming a part of this specification, in which like reference characters indicate correponding parts throughout the several views, and in which.

Figure 1:
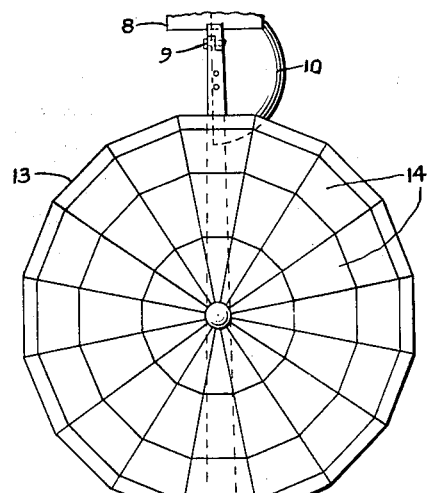
Fig. 1 is a top plan view of my invention partly broken away.
Figure 2:
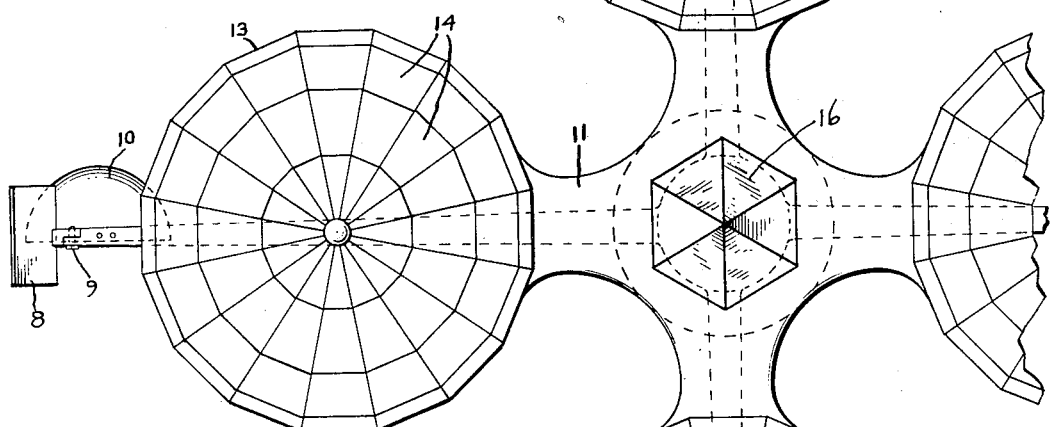
Fig. 2 is a sectional view through the center of rotation of the beacon.
Figure 2:
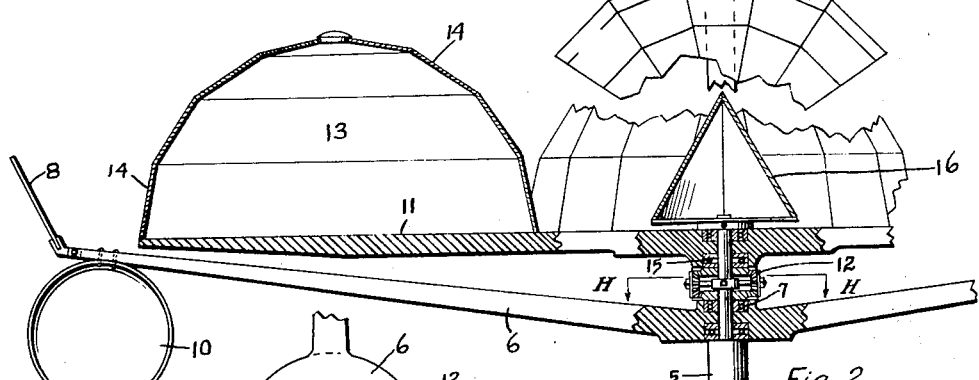
Figure 3:
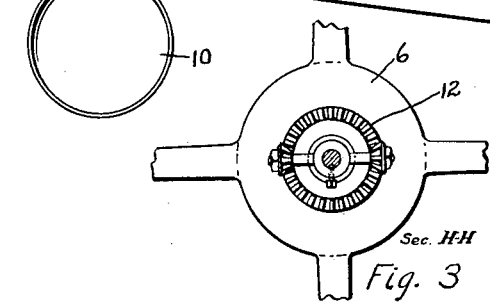
Fig. 3 is a section on line H—H of Fig. 2.

Referring more particularly to the drawing, 5 indicates a fixed standard on which is mounted a spider 6 free to rotate on ball bearings 7. Reflecting members 8 of silvered glass or highly polished and non-corroding material are adjustably mounted on the ends of the spider arms so that their reflecting surfaces may be placed at any desired angle with respect to the horizontal plane of the spider. The ends of the spider arms are jointed as at 9, Fig. 1, to permit of the desired adjustment of the reflecting members. Wind cups 10 are disposed preferably on the under side of the spider arms adjacent their ends to provide the driving force for rotating the spider on the standard. Although I have stated that it is desirable to mount the wind cups on the under side of the spider arms, it is to be understood that they may be disposed at other advantageous points thereon, if desired, and further, that the motive power for driving the spider may be an electric motor or other means instead of the wind cups.

A frame structure 11 of the same general shape as the spider but of lesser diameter also is mounted to rotate on the standard 5 on ball bearings 15, and derives its motion from the spider through a planetary gearing 12 interposed between it and the spider. The movements of the said two members are simultaneous, but due to the gearing are in reverse directions. The arms of the frame structure carry dome-shaped members 13 whose surfaces are formed by contiguous light reflecting facets 14 having common perimeters, preferably of small area and having geometrical form, said facets being arranged in circles on the dome-shaped members whose planes are perpendicular to the axis of rotation of the frame structure. A pyramidal member 16, whose surface is composed of triangular reflecting facets angularly placed with respect to the frame structure, is positioned centrally of the frame structure. The dome and pyramidal members are preferably hollow for lightness.

By the above arrangement and construction, rays of light either from the sun or suitable artificial sources will be reflected from each facet successively as it is brought into the line of the observer's vision giving the effect of a flashing or scintillating beacon.

By arranging the facets in parallel circles, whose planes are perpendicular to the vertical axis of rotation of the frame structure, the facets of adjacent rings will come successively within the line of vision, and the number of angles at which the rays of light will be reflected will be increased, so no matter what the observer's relative position to the beacon may be, he will always be in the angle of reflection from a number of facets successively.

In other words, beams of light will be continuously reflected in inclined planes which will sweep across all points of the horizon, so that no matter what the position of the observer may be, whether above or below the beacon, he will be within the reflective angles of the beacon instead of possibly between them, as would be the case were the beams of light reflected in horizontal planes parallel with the horizon.

Thus, my beacon may be effectively used as a land marker for observers above the horizon as well as below, as in the case of an aviator, a ship at sea or a traveller on land, and by the substitution of an artificial source of light of sufficient strength, the beacon can be used during the night as well as the day and will appear as a distant point of light for the purposes described.

It will be understood that the above description and accompanying drawing comprehend only the general and preferred embodiment of my invention, and that various changes in the details of construction, proportion and arrangement of parts may be resorted to within the scope of the appended claims without sacrificing any of the advantages of this invention.

The invention described herein may be manufactured and used by or for the Government of the United States of America for governmental purposes without the payment of any royalty thereon.

What I claim is:

1. In a beacon of the character described, a standard, a spider rotatably mounted thereon, reflecting surfaces carried by the spider, a frame structure disposed above the spider and rotatably mounted on the standard, a planetary gearing between the said structure and spider, reflecting members carried by the frame structure, and means for collecting motive force for the assemblage.

2. In a beacon of the character described, a standard, a spider rotatably mounted thereon, adjustable reflecting surfaces carried by the spider, a frame structure rotatably mounted on the standard, reflecting members carried by the frame structure, a planetary gearing interposed between the said structure and spider, and means for collecting motive force for the assemblage.

3. In a beacon of the character described, a standard, a spider rotatably mounted thereon, adjustable reflecting surfaces carried by the spider, jointed spider arms for adjusting said surfaces, a frame structure rotatably mounted on the standard, reflecting members carried by said structure, a planetary gearing interposed between the said structure and spider, and means for collecting motive force for the assemblage.

4. In a beacon of the character described, a standard, a spider rotatably mounted on the standard, adjustable reflecting surfaces carried by the spider, a frame structure rotatably mounted on the standard, dome-shaped reflecting members carried at the extremities of the frame structure, a planetary gearing interposed between the said structure and spider, and means for collecting motive force for the assemblage.

5. In a beacon of the character described, a standard, a spider rotatably mounted on the standard, adjustable reflecting surfaces carried by the spider, a frame structure rotatably mounted on the standard, a planetary gearing interposed between said structure and the spider, dome-shaped reflecting members carried by said structure, a pyramidal reflecting surface centrally disposed on the frame structure, and means for collecting motive force for the assemblage.

6. In a beacon of the character described, a standard, a spider rotatably mounted on the standard, reflecting surfaces carried by the spider, a frame structure rotatably mounted on the standard, reflecting members carried by said structure, said spider and frame structure being simultaneously rotatable but in adverse directions, and a planetary gearing between the frame structure and spider for producing said adverse movements.

PAUL M. BATES.